US009296851B2

(12) United States Patent
Luettgen

(10) Patent No.: US 9,296,851 B2
(45) Date of Patent: Mar. 29, 2016

(54) PROCESS FOR CONTINUOUS EMULSION POLYMERIZATION

(75) Inventor: Karsten Luettgen, Geleen (NL)

(73) Assignee: DPx Holdings B.V., Amsterdam (NL)

(*) Notice: Subject to any disclaimer, the term of this patent is extended or adjusted under 35 U.S.C. 154(b) by 149 days.

(21) Appl. No.: 13/637,484

(22) PCT Filed: Apr. 1, 2011

(86) PCT No.: PCT/EP2011/055129
§ 371 (c)(1),
(2), (4) Date: Dec. 11, 2012

(87) PCT Pub. No.: WO2011/121124
PCT Pub. Date: Oct. 6, 2011

(65) Prior Publication Data
US 2013/0123427 A1    May 16, 2013

(30) Foreign Application Priority Data

Apr. 1, 2010    (EP) .................................... 10158997

(51) Int. Cl.
| | |
|---|---|
| C08F 2/46 | (2006.01) |
| C08G 61/04 | (2006.01) |
| C08F 261/04 | (2006.01) |
| C08F 2/00 | (2006.01) |
| C08F 2/22 | (2006.01) |
| C08F 4/28 | (2006.01) |

(52) U.S. Cl.
CPC .................. C08F 261/04 (2013.01); C08F 2/00 (2013.01); C08F 2/22 (2013.01); C08F 4/28 (2013.01)

(58) Field of Classification Search
CPC ..................................... C08F 2/00; C08F 4/28
USPC .............................................. 522/3, 1; 520/1
See application file for complete search history.

(56) References Cited

U.S. PATENT DOCUMENTS

| | | | |
|---|---|---|---|
| 5,912,276 A * | 6/1999 | Adamski et al. ................ 521/64 |
| 6,555,629 B1 | 4/2003 | Pysall et al. | |
| 7,378,473 B2 | 5/2008 | Torii et al. | |
| 2002/0013430 A1 | 1/2002 | Klaerner et al. | |
| 2004/0143059 A1* | 7/2004 | Cabrera ......................... 524/800 |
| 2008/0146448 A1* | 6/2008 | Dyllick-Brenzinger et al. ............................ 504/358 |
| 2009/0036603 A1 | 2/2009 | Saita et al. | |

FOREIGN PATENT DOCUMENTS

| | | |
|---|---|---|
| CN | 101142242 A | 3/2008 |
| DE | 198 16 886 | 10/1999 |
| EP | 1 439 196 | 7/2004 |
| JP | 2002-512272 A | 4/2002 |
| JP | 2004-197083 A | 7/2004 |
| JP | 200756077 A | 3/2007 |
| JP | 2008-31419 A | 2/2008 |
| JP | 2009-29984 A | 2/2009 |
| JP | 200957480 A | 3/2009 |
| JP | 200979106 A | 4/2009 |
| WO | WO 97/45456 | 12/1997 |
| WO | WO 00/53640 | 9/2000 |
| WO | WO 2006/094526 | 9/2006 |

OTHER PUBLICATIONS

Zhang, Wenmin, Juan Gao, and Chi Wu, Microwave Preparation of Narrowly Distributed Surfacnat Free Stable Polystyrene Nanospheres, 1997, Macromolecules, 30, 6388-6390.*
Bogdal et al, "Microwave Assisted Synthesis, Crosslinking, and Process of Polymeric Materials," Adv Polym Sci (2003) 163, pp. 193-263.
Zhang et al, "Communications to the Editor," Macromolecules, vol. 30, No. 20, 1997, pp. 6388-6390.
International Search Report for PCT/EP2011/055129 mailed Jun. 29, 2011.
Written Opinion of the International Searching Authority mailed Jun. 29, 2011.
Office Action for CN-201180017879.5, mailed Sep. 6, 2013, 9 pages.
Office Action for CN-201180017879.5, mailed May 20, 2014, 12 pages.
Office Action for CN-201180017879.5, mailed Jan. 27, 2015, 7 pages.
Notification of Registration and Granting a Patent Right for CN-201180017879.5, mailed Jul. 3, 2015, 5 pages.
Communication Pursuant to Article 94(3) EPC for EP-11713240.7, mailed Sep. 6, 2013, 7 pages.
Decision to Grant for EP-11713240.7, mailed Jul. 3, 2014, 3 pages.
Notice of Reasons for Rejection for JP-2013-501867, mailed Aug. 12, 2014, 4 pages.
Notice of Reasons for Rejection for JP-2013-501867, mailed Apr. 28, 2015, 6 pages.
International Preliminary Report on Patentability for PCT/EP2011/055129, mailed Oct. 11, 2012, 5 pages.
Loupy, André, "Microwaves in Organic Synthesis", Published by Wiley-VCH, ISBN: 9783527314522, Nov. 29, 2006, 24 pages.

* cited by examiner

*Primary Examiner* — Ling Choi
*Assistant Examiner* — Jessica E Whiteley
(74) *Attorney, Agent, or Firm* — Pierce Atwood LLP; Raymond G. Arner

(57) ABSTRACT

The invention relates to a process for the preparation of polymers and to an apparatus for performing this process. The apparatus comprises devices and reactors that are combined in the sequence of first a mixing device, second a flow microwave and optionally third one or more additional reactors.

10 Claims, 1 Drawing Sheet

PROCESS FOR CONTINUOUS EMULSION POLYMERIZATION

CROSS-REFERENCE TO RELATED APPLICATIONS

This application is the U.S. national phase of International Application No. PCT/EP2011/055129 filed 1 Apr. 2011 which designated the U.S. and claims priority to EP 10158997.6 filed 1 Apr. 2010, the entire contents of each of which are hereby incorporated by reference.

BACKGROUND OF THE INVENTION

The present invention relates to a process for the preparation of polymers and to an apparatus for performing this process.

For the manufacturing of polymers batch and semi batch procedures are known and applied (see Ullmann's Encyclopedia of Industrial chemistry, 5.ed on CDrom). For both types of batch processes the thermal process safety is a challenge as after the start of the mostly exothermal reaction only minor control regarding the conversion and heat release is possible. This means that it is very difficult to maintain a stable product quality resulting in broad tolerances of the product specifications.

A further disadvantage is that certain parameters of such a batch process are only valid for a specific equipment (combination of reactor, stirrer), so that an increase of productivity by using a larger reactor or alternatively the usage of a different reactor is not easily possible.

It is known that an emulsion/suspension polymerization may be performed in a continuous mode, whereby for example in a static mixer an emulsion is formed, and the polymerization reactions during this process result in a suspension of the product in an aqueous or organic solvent. Such a setup is described for example in DE19816886C2 or EP1439196A1. In both patents it is described that a monomer solution and a radical initiator have to be two different feeds that are mixed by a micro mixer. A polymerization may make use of a radical initiator to start the radical chain reaction. The radical initiator is activated by a temperature increase either prior or after mixing with the reaction mixture. In DE19816886C2 and EP1439196A1 the radical initiator is heated before the mixing, such that radicals are formed. Therewith, the monomers undergo a reaction to form the polymer during and directly after micro mixing.

The temperature increase needed for the start of the radical chain reaction may be applied by heating the reaction vessel or by leading the reaction mixture (or a part of the reaction stream) through a heat exchanger device. Continuous flow heating using a microwave is a well known alternative since years. Commercially available microwave flow heaters are able to generate between 100 W to 30 KW and more microwave power to heat a flow of liquid up to 350° C. and more. The advantage of microwave heating especially for a continuous process is that a uniform and exact temperature profile may be generated along the path which is heated. Furthermore the heat comes "from inside out" meaning that no temperature gradient from the wall of tube to the flowing media is present which may lead to deposition of solids and over reaction products at the inner side of the tube (see Microwaves in Organic Synthesis, Andre Loupy, Wiley-VCH, 2006 ISBN-13 978-3527314522). Therefore a microwave is very suitable to heat reaction mixtures and especially to activate radical initiators for polymerization reactions as they remain unactivated prior to the heating and will be activated in a very homogeneous and very fast manner. This also improves the safety situation as it is easily to "switch-on" or "switch-off" the reaction by control of the microwave irradiation. The benefits of having microwave activation for radical initiated polymerization are for example described by Bogdal et al. (Adv. Polym. Sci. 2003, 163, 193-263).

A drawback of the processes as disclosed in DE199816886C2 or EP1439196A1 is that the reaction conditions and the design of the setup have to be chosen very properly to control the reaction, to avoid depositioning of product on the wall of the equipment and to control the properties of the product as the reaction is started in non-equilibrium state, i. e formation of emulsion and reaction occur at the same time.

BRIEF SUMMARY OF THE INVENTION

The invention now provides a process for the preparation of polymers, wherein at least two immiscible starting material flows are mixed in a mixing device, wherein one or more monomers and optionally one or more radical initiators are present in the same or in separate starting material flows, wherein the temperature of the material flow in the mixing device is kept below the initiation temperature of the one or more radical initiators or kept below the temperature at which polymerization or crosslinking of the monomers could start, and wherein the mixed material flow is subsequently heated to a temperature above the initiation temperature of the one or more radical initiators or to a temperature above the lowest possible temperature at which polymerization of the monomers would start in a flow microwave to start polymerization of the monomers.

With the process of the invention polymer beads with a uniform and constant quality are generated. The process of the invention provides the ability to scale up in an easy manner, whilst meeting the requirements of productivity rate. Furthermore, the process of the invention promotes easy and safe processing, since the reaction can be stopped at any time by switching-off microwave initiation, therewith stopping the activation of the radical initiator.

In the context of this application, with continuous processing or processing in a continuous mode is meant an uninterrupted sequence of operations, wherein raw materials are continuously received and are processed through to a product is obtained comprising polymer particles.

Furthermore, in the context of this application, immiscible starting material flows relates to the fact that the starting material of the first flow and the second flow form two distinct phases. This phase separation can be determined with several well-known techniques such as optical diffraction, conductivity measurement, visual observation, density measurement.

Compounds suitable for use as monomers in the process according to the invention include, but are not limited to: alkenes such as for example ethylene and higher analogues, but also comprising substances with more than one double bond as butadiene and higher analogues, vinyl halogenides such as vinylchlorides, vinylesters, compounds comprising at least one double bond and an aromatic ring such as in styrene, heterocyclic vinyl compounds such as 2-vinyl pyridine, acrylic acid and acrylic acid derivatives such as methyl acrylate. Obviously, the person skilled in the art is able to find alternative starting materials for the process according to the invention, and as such oligomers can be applied as an alternative to monomers.

Initiators for radical polymerization may be either soluble in aqueous or organic media. Suitable radical initiators for use in the process according to the invention include, but are not limited to: inorganic peroxides such as hydrogen peroxide or methyl peroxodisulfate, acetyl peroxides such as dibenzoyl peroxide or dilauroyl peroxide, hydroperoxides such as t-butyl hydroperoxide, azo compounds such as 2,2'-bis isobutyronitrile. The previously named initiators may be used alone or as a mixture of different compounds.

In the material flows according to the invention also other reagents can be present, including but not limited to (organic) solvents, additives, salts, emulsifiers, emulgators, water and surfactants. Surfactants may be present in the process according to the invention, but are not necessary. In a preferred embodiment, the process according to the invention is carried out in the absence of surfactants.

The mixing device applied in the invention shall be capable of forming a monodisperse emulsion with an average droplet size in the range of 1 µm to 2000 µm, which emulsion is characterized by a narrow particle size distribution. Such a monodisperse emulsion consists only of uniformly sized droplets with a typical variation coefficient ($\sigma/d_v$) of less than 1 ($\sigma$=standard deviation; $d_v$=average particle diameter—as calculated on the basis of particles size measurement based on the volume fraction as determined in particle size measurements using either a Malvern 2000 Mastersizer or a Horiba LA-950 particle analyzer).

The width of the particle size distribution and the variation coefficient may be determined for example by sieve analysis, photo analysis or laser diffraction methods.

The mixing device serves to mix at least two with each other immiscible flows containing the reaction partners of the polymerization or polycondensation reaction. The temperature of the material flow in the mixing device is kept below the initiation temperature of the one or more radical initiators, so that no radicals are formed in the mixing device. Initiation temperatures vary among radical initiators and will also depend on the composition of the reaction mixture. The temperature may vary between wide limits. Typically, the temperature of the material flow in the mixing device is kept above −30° C. Preferably, this temperature is kept above −10° C., more preferably the temperature is kept above 0° C. Typically, the temperature is kept below 150° C. Preferably, the temperature is kept below 60° C., and most preferably below 40° C. Suitable mixing devices are for example a static mixer, a micro mixer or a mini mixer. Static mixers are commercially available by different companies, for example from Sulzer AG, Switzerland. Micro and mini mixers have been described in several publications (for the theory behind mixing in micro and mini structured devices see Transport Phenomena in Micro Process Engineering, Springer Berlin 1 ed. 2007 ISBN-13: 978-3540746164) and are commercially available for example from IMM (Institut für Mikrotechnik, Mainz), IMVT (Institut für Mikroverfahrenstechnik, Karlsruhe) and other research departments or companies. The difference between a micro- or a mini-mixer rely on the size, dimensions and design of the channels within the devices. The advantages when using micro and mini-structured devices are extensively explained in Micro Process Engineering: A Comprehensive Handbook Wiley-VCH 1st ed 2009, ISBN-13: 978-3527315505. Preferably, in the process of the invention, a micro mixer is applied.

The mixed material flow leaving the mixing device is subsequently heated in a flow microwave to start polymerization of the monomers at a temperature above the initiation temperature. Typically, the temperature in the flow microwave is kept above 20° C., preferably above 40° C., and most preferably above 60° C. Typically, the temperature in the flow microwave is kept below 200° C., preferably below 120° C., more preferably below 100° C. The advantage of using a micro wave to heat up the reaction mixture and to initiate the polymerization of the monomers, which if a radical initiator is present is started by the decomposition of the initiator it that the cold reaction mixture does not undergo any reaction process and therefore does not generate any reaction heat prior to the micro wave activation. This means that the emulsion-forming process which determines the particle size distribution and the final quality and properties of the final product proceeds undisturbed from secondary processes. At the moment of sudden temperature increase by the micro wave irradiation the radical chain reaction is initiated, if a radical initiator is present, this occurs by the decomposition of the initiator in a very controlled manner, with the ability of exact temperature control during the reaction.

In one embodiment of the present invention, the reaction material passes one or more additional reactors after being heated in the flow microwave. Such additional reactors include, but are not limited to: fed-batch reactor, reactor cascade, loop reactor, tube reactor or pipe bundle reactor. Preferably, a tube reactor is applied as additional reactor. Even more preferably, this tube reactor is equipped with a means for keeping the temperature in the tube reactor constant. A jacketed tube reactor may serve this purpose. In a preferred embodiment, an isothermal temperature profile or a temperature gradient is applied along the process comprising the flow microwave and one or more of the additional reactors, in the case where these are present.

In another embodiment of the invention, the material of construction for the reactors described above or for the coating of these reactors is preferably Teflon or another chemically inert, hydrophobic material. The material of construction is preferably chemically inert and prevents deposition of reaction material on the reactor wall. Within the context of this application, with chemically inert is meant that there will be no chemical reaction between the construction material and the reaction material.

In yet another embodiment of the present invention, the process of the invention is further characterized in that after the emulsion is formed by mixing the starting materials, only laminar flow is present through the device and optional additional reactors following the mixing device, to maintain the droplet-size and—distribution being formed by the mixing device and to avoid shear forces which would lead to coalescence of the droplets. Preferably, this laminar flow has a Reynolds number of less than 500, more preferably less than 100 and most preferably less than 10.

The process of the invention can suitably be applied for the production of registered pharmaceutical intermediates or advanced pharmaceutical intermediates. The polymers afforded from the continuous process according to the invention may be subjected to further reaction/treatment steps such as saponification, elimination, salt changes or washing procedures. In an embodiment of this invention, the polymerization process according to the invention is followed by a saponification, elimination, salt changes or washing procedures.

The invention also relates to an apparatus for the process according to the invention, wherein the devices and reactors are combined in the sequence of first a mixing device, second a flow microwave and optionally third one or more additional reactors. A typical setup consist of at least 2 combinations of storage vessel and pump were mixtures of reactants and solvents (including at least in one mixture a monomer in case of a polymerization reaction) is fed to a mixing device. This mixing device may be a static mixer of micro (mini) mixer to generate an emulsion. The mixing device is directly connected to a flow microwave to heat up the reaction mixture to a desired temperature. Optionally, a tube reactor placed directly after the flow microwave will give control over the reaction energy and give sufficient conversion to the reaction. The final product mixture is collected in a collecting vessel.

The invention further relates to all possible combinations of different embodiments and/or preferred features according to the process and apparatus according to the invention as described herein.

DETAILED DESCRIPTION OF THE INVENTION

EXAMPLES AND COMPARATIVE EXAMPLES

A) Continuous Mode

Examples 1-3

Figure 1:
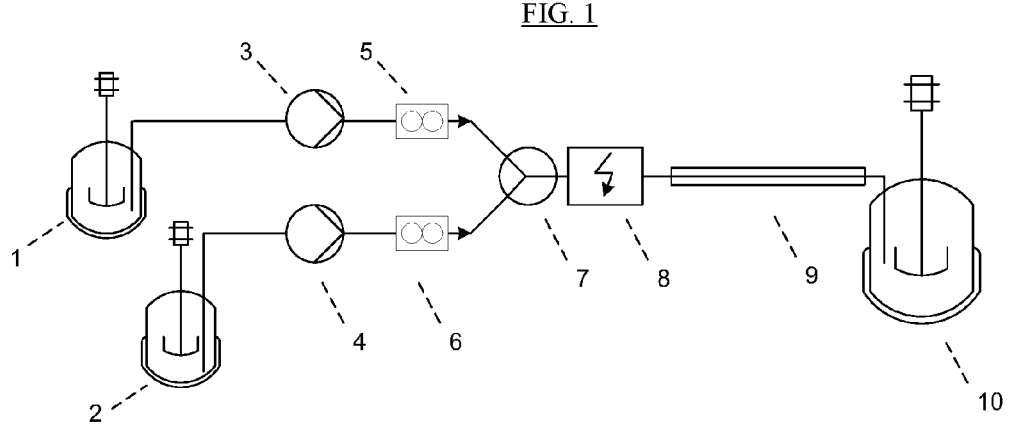
FIG. 1 shows the set-up used to perform examples 1-3.

FIG. 1 is showing the setup being used for examples 1-3. In two stirred vessels 1 and 2 the two separate streams are prepared. The two streams are being fed to a mixer 7 using two pulsation free pumps 3 and 4. To control the flow rate of each pump flow meters 5 and 6 are installed in the individual feed lines. The emulsion being formed in the mixer 7 is directly led to a flow micro wave 8 which is connected to a jacked tube reactor 9. The reaction suspension leaving the tube reactor 9 is collected in the jacked reactor 10. All jacked equipment comprised individual heating or cooling facilities with respect to the needs of the reaction.

Solutions of methyl acrylate derivative, divinylbenzene and diene (molar ratio 92:3:5) containing 0.1 mol % radical initiator (=organic feed) and an aqueous buffer consisting of $Na_2HPO_4$, $NaH_2PO_4$, NaCl (1 w/w %, 0.07 w/w %, 4 w/w %) and Polyvinylalcohol (MW 85000-124000; 1.1 w/w %) (=aqueous feed) are pumped into a micro mixer at given flow rates (see following table). Individual channel sizes in the micro mixer are 100×70 micrometer and the mixer used compromises in total 50 channels which are divided into two systems of 20/resp. 30 channels. The organic phase is connected to the port leading to the 30 channels. The droplet size in the emulsion leaving the mixer is directly proportional to the particle size of the final cured polymer. The formed emulsion is heated to >70° C. using the flow microwave to initiate the polymer chain reaction (residence time in micro wave approx. 5 seconds). The reaction mixture already containing solid particles is succeeding lead through the jacked tube reactor at 80° C. providing a residence time of approx 200 seconds and collected in the heated stirred reactor. The product is filtered off, washed with water and dried under vacuum to afford the final polymer.

B) Continuous Mode

Comparative Example 4

Figure 2:
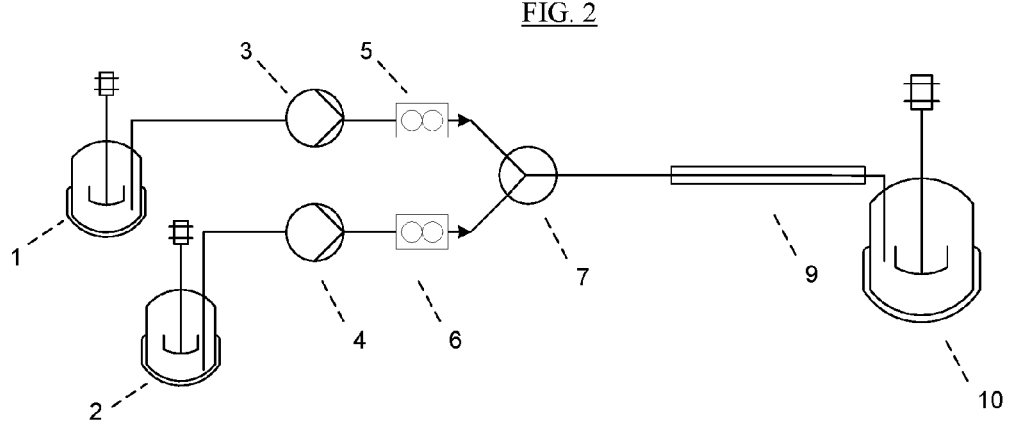
FIG. 2 shows the set-up to perform comparative example 4.

For comparative example 4 the setup shown in FIG. 2 is used. The only difference to FIG. 1 is that no flow micro wave is installed.

Solutions of methyl acrylate derivative, divinylbenzene and diene (molar ratio 92:3:5) containing 0.1 mol % radical initiator (=organic feed) and an aqueous buffer consisting of $Na_2HPO_4$, $NaH_2PO_4$, NaCl (1 w/w %, 0.07 w/w %, 4 w/w %) and Polyvinylalcohol (MW 85000-124000; 1.1 w/w %) (=aqueous feed) are pumped into the micro mixer at given flow rates (see following table). Channel sizes in the micro mixer are 100×70 micrometer and the mixer used compromises in total 50 channels which are divided into two systems of 20/resp. 30 channels. The organic phase is connected to the port leading to the 30 channels. The formed emulsion is lead through a jacked tube reactor at 80° C. providing a residence time of approx 200 seconds and collected in a heated stirred reactor.

It was not possible to collect enough material for a particle size distribution as decomposition occurred at the tube wall resulting in coalescence of the emulsion prior to formation of solid polymer particles and finally blocking of the setup. Visual judgment of the obtained polymer particles showed a very broad particle size distribution including large lumps of up to 3 mm (target diameter of this setup: <200 micrometer).

C) Bath

Comparative Example 5

Acrylate derivative, divinylbenzene and diene (molar ratio 92:3:5) are placed in a 1 L laboratory glass reactor equipped with a 2-blade stirrer. To the solution of monomers 0.1 mol % of the radical initiator are given and stirred until a mixture is formed. To the organic reaction mixture an aqueous buffer consisting of $Na_2HPO_4$, $NaH_2PO_4$, NaCl (1 w/w %, 0.07 w/w %, 4 w/w %) and Polyvinylalcohol (MW 85000-124000; 1.1 w/w %) is added and stirring of the reactor is adjusted to 450 RPM to form an emulsion. After heating to 55° C. a temperature program is started characterized by a 8° C./hour gradient to allow controlled initiation of the polymer chain reaction. The reaction mixture is kept at 80° C. for 5 hours followed by product filtration and washing with water. By drying under vacuum the product is obtained.

TABLE

| | Target | 1 | 2 | 3 | 4 | 5 |
| --- | --- | --- | --- | --- | --- | --- |
| | | | Continuous mode | | | Batch |
| fed rate organic (ml/min) | — | 4.6 | 4 | 5 | 5 | — |
| fed rate aqueous (ml/min) | — | 21 | 32 | 38 | 22 | — |
| ratio organic/ aqueous phase | — | — | — | — | — | 1:4 (mass ratio) |
| | | Properties of final cured polymer | | | | |
| D(10) * (-μm) | >40 | 85 | 76 | 46 | not determinable | 130 |
| D(50)* (-μm) | 80-110 | 154 | 128 | 83 | not determinable | 218 |
| D(90)* (-μm) | <200 | 298 | 276 | 184 | not determinable | 305 |
| $\frac{\sigma}{\overline{d}_V}$ | ≤1 | 1 | 0.8 | 0.8 | not determinable | 0.3 |

D(10), D(50), D(90) particle size fractions were determined using either a Malvern 2000 Mastersizer or Horiba LA-950 particle analyzer. The dry polymer was mixed with water and 1 drop of TWEEN 80 (surfactant) and ultrasonicated for 1 minute prior to measurement. The particle size fractions were calculated based on the volume of the particles.
σ standard deviation
$\overline{d}_V$ = D50 (volume) – average particle diameter (calculated on volume fraction)

The invention claimed is:
1. Process for the preparation of polymers in a continuous mode, wherein at least two immiscible starting material flows are mixed in a mixing device, wherein one or more monomers and optionally one or more radical initiators are present in the same or in separate starting material flows, wherein the mixing device generates an emulsion with an average droplet size of 1 μm to 2000 μm from the starting material flows, wherein the temperature of the material flow in the mixing device is kept below the initiation temperature of the one or more radical initiators or kept below the polymerization or crosslinking temperature of the monomers, and wherein the mixed material flow is subsequently heated in a flow microwave to start polymerization of the monomers.

2. Process according to claim 1, wherein the temperature of the material flow in the mixing device is kept between $-10°$ C. and $60°$ C.

3. Process according to claim 1, wherein the temperature in the flow microwave is kept between $40°$ C. and $120°$ C.

4. Process according to claim 1, wherein the mixing device generates the emulsion in which a particle size distribution has a variation coefficient of less than 1.

5. Process according to claim 1, wherein the material passes one or more additional reactors after heating in the flow microwave.

6. Process according to claim 5, wherein the additional reactor is a tube reactor.

7. Process according to claim 5, wherein an isothermal temperature profile or a temperature gradient is applied along the process comprising the flow microwave and one or more of the additional reactors, when present.

8. Process according to claim 1, wherein the mixed material flow in the process is a laminar flow with a Reynolds number of less than 100.

9. Process according to claim 1, wherein a registered pharmaceutical intermediate or an advanced pharmaceutical intermediate is produced.

10. Apparatus for the process according to claim 1, wherein the devices and reactors are combined in the sequence of first a mixing device, second a flow microwave and optionally third one or more additional reactors.

* * * * *